United States Patent [19]

Yamamoto et al.

[11] 4,391,211
[45] Jul. 5, 1983

[54] AUTOMATIC SEWING MACHINE

[75] Inventors: Yoshikazu Yamamoto; Toshiaki Yanagi, both of Nagoya, Japan

[73] Assignee: Brother Kogyo Kabushiki Kaisha, Nagoya, Japan

[21] Appl. No.: 204,993

[22] Filed: Nov. 7, 1980

[30] Foreign Application Priority Data

Nov. 28, 1979 [JP] Japan .............................. 54-154055

[51] Int. Cl.³ ............................................ D05B 21/00
[52] U.S. Cl. ............................. 112/121.12; 112/220; 112/262.1
[58] Field of Search ...................... 112/121.12, 121.11, 112/220, 266.1, 221, 262.1, 158 E, 275, 277, 102, 103

[56] References Cited

U.S. PATENT DOCUMENTS 4,164,192 8/1979 Herr et al. ...................... 112/220 X
4,221,176 9/1980 Besore et al. .................. 112/121.12

Primary Examiner—Peter P. Nerbun
Attorney, Agent, or Firm—Browdy and Neimark

[57] ABSTRACT

An automatic sewing machine provided with a memory for storing stitch instructions directing a relative position between a vertically reciprocated needle and a work piece and a speed control means for controlling the machine's drive motor at a suitable speed for each particular sewing operation carried out according to the stitch instructions. To determine the maximum permissible speed suitable to the variation of the relative position for each stitch, all of the stitch instructions in the memory are checked by a central processing unit before starting each sewing operation. The unit provides a control signal concerning the maximum permissible speed to a speed control means so that the driving speed of the drive motor is limited to no more than the maximum permissible speed.

9 Claims, 5 Drawing Figures

AUTOMATIC SEWING MACHINE

BACKGROUND OF THE PRESENT INVENTION

This invention relates to an automatic sewing machine for carrying out sewing operation according to stitch instructions which are read out or extracted in a predetermined sequence from a memory and include position data designating a relative position between a needle and a workpiece, and more particularly to the drive motor speed control of the machine in the sewing operation.

It has been conventional practice in this type of sewing machines that a permissible drive speed, i.e., the maximum permissible drive speed of the drive motor is determined according to the kind of sewing operation specified to an individual machine. In other words, a machine which sewing operations including a fairly large relative positional variation or relative movement between the needle and the workpiece, is allotted from the outset a comparatively low maximum permissible speed corresponding to the larger relative movement allowed. This maximum permissible speed naturally regulates all kinds of other sewing operations which the automatic sewing machine can perform. A specific speed control for the drive motor for the automatic sewing machine is designated or determined according to the above-mentioned predetermined maximum permissible speed allotted thereto.

In this sort of automatic sewing machine, even when a sewing operation can be carried out with comparatively small relative movements, the drive motor was in fact obliged to be limited to a maximum permissible speed of a comparatively low level irrespective of its capability of driving at a higher speed from the standpoint of the machine's construction and the performance of the drive motor. There thus arose a problem of using the machine at a performance level much lower than the true variable performance level when the sewing operation included only a smaller relative movement amount between the needle and the workpiece, which degraded the efficiency of the sewing operation uselessly. In order to eliminate this disadvantage, U.S. Pat. No. 4,108,093 discloses means for installing a speed control circuit capable of regulating the speed of the drive motor so as to raise it up to the maximum permissible speed corresponding to a sewing operation carried out by the amount of the least relative movement among various types of sewing operations specified to an automatic sewing machine, and letting a memory store predetermined maximum permissible speeds in accordance with each sewing operation mode. In this cited reference, selection and change of the maximum permissible speed in response to the selection of each stitch pattern became possible, because various maximum permissible speeds can be memorized permanently or fixed according to the modes of the stitching patterns used.

In this type of technology the respective maximum permissible speed is stored permanently in the memory according to each sewing operation. When this data concerning the maximum permissible speed is stored in the memory by a programmer, the variation of the relative position according to each stitch instruction must be individually checked before the maximum permissible speed can be determined by the programmer.

This prior technology is still disadvantageous as stated herein. For example, these disadvantages include that it is a fairly large burden on the programmer. In the field of industrial machines, more than a thousand stitches are usually formed in a stitch pattern. To check all of the variations of the relative positions under the control of each stitch instruction, this entails a substantial risk of mis-storing a maximum permissible speed.

SUMMARY OF THE INVENTION

A primary object of this invention is to therefore provide a sewing machine capable of automatically determining the maximum permissible speed adapted to each sewing operation, by checking all of the stitch instructions regarding the individual sewing operation in a central processing unit.

Another object of this invention is to provide a sewing machine having a control program for determining the maximum permissible speed speedily and accurately against each of the stitch instructions according to the program.

Still another object of this invention is to provide a sewing machine having a manual selector means operative for setting a speed of the drive motor at an automatically determined maximum permissible speed or less.

Another object of this invention is to provide a method of sewing a workpiece including a step of scanning all stitch instructions for producing a desired stitch pattern, to examine variations of the relative position between the needle and the workpiece directed by each stitch instruction, a step of determining a maximum permissible speed depending on the result of the examination, and a step of limiting the actual speed of the drive motor for reciprocating the needle to the no more than maximum permissible speed.

Other objects of this invention include providing a sewing machine and a sewing method capable of efficiently and accurately forming a large size stitch pattern consisting of a large number of stitches.

To achieve the above-mentioned objects, sewing machines of this invention are provided with a memory permanently storing a control program for checking stitch instructions stored in a storage means and a central processing unit operable in accordance with the control program.

The stitch instructions stored in the storage means direct, for example, the number of the driving pulses to two pulse motors for moving a work holder with the workpiece along X and Y axes, and rotation direction of the pulse motors. That is to say, the stitch instruction includes position data consisting of pulse number data and direction data for controlling variation of the relative position, i.e., relative movement amount between the needle and the workpiece.

Preferably, a maximum permissible speed adapted to a desired sewing operation is selected, from among a plurality of maximum permissible speeds predetermined considering the kinds of sewing operations performable in a specific automatic sewing machine, and set by virtue of the control function of the central processing unit. The central processing unit searches or scans, to select and set the maximum permissible speed, so as to determine, for example, if there is a variation of the relative position exceeding the one predetermined among the stitch instructions to perform the desired sewing operation. This is done by comparing the variation of the relative position according to each stitch instruction with a predetermined value. The maximum permissible speed is selected and set from the result of the scanning. This operation of selecting and setting is carried out very rapidly immediately before the start of each sewing operation, for example, synchronously with the switching operation to start the machine drive. This high speed scanning of the instructions can be easily carried out by a central processing unit such as a microprocessor.

The speed of the drive motor may be a maximum permissible speed which is determined and set by means of searching the largest variation of the relative position under the influence of the stitch instructions and computing a corresponding value.

The speed control means limits the drive speed of the drive motor according to a control signal related to the set maximum permissible speed. The speed control means is preferably connected to a manual selector means prepared for selecting a desired speed, suitable to the content and state of the sewing operation, from among speeds less than the set maximum permissible speed. The speed of the drive motor is determined in this instance according to a control signal related to the maximum permissible speed and a speed selecting signal related to the manually selected speed at the selector means.

A feature of this invention lies is that the maximum permissible speed suitable to each sewing operation is not determined in advance and permanently stored, but is automatically determined by checking the stitch instructions used in a specific sewing operation immediately before the start thereof. This invention has succeeded in completely eliminating the conventional risk of possible collision of the needle and the presser foot incurred by an error signal from falsely stored maximum permissible speed data in the storage means. Other objects and characteristics of this invention will be clearly understood from the following descriptions of the preferred embodiments.

DETAILED DESCRIPTION OF THE PREFERRED EMBODIMENTS

Figure 1:
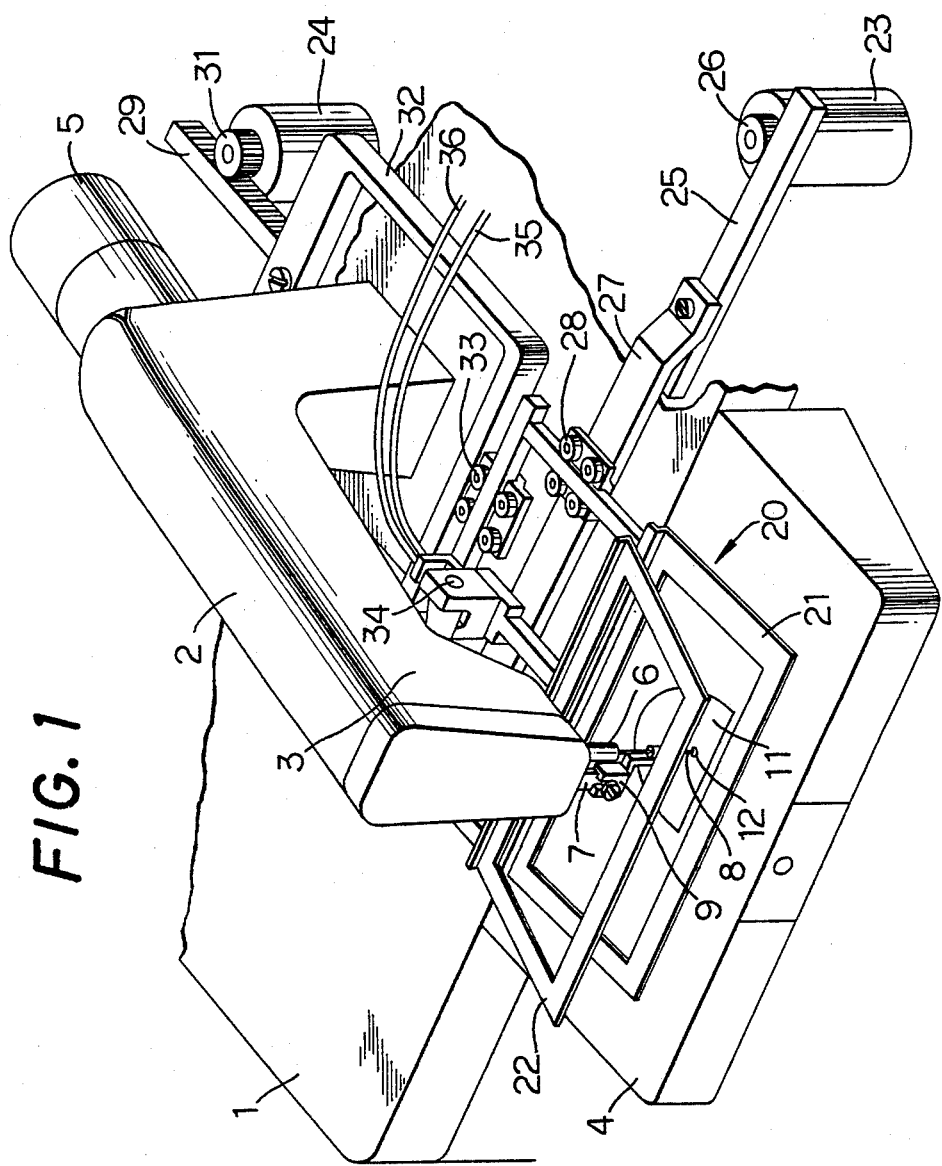
FIG. 1 is a general perspective view of an embodiment of a sewing machine in accordance with this invention.

On a bed 1, as can be seen in FIG. 1, a bracket arm 2 is installed hanging over the edge thereof thereover. A head 3 of the bracket arm 2 is located just above a table 4 project forwardly from the bed 1. On the head 3 a needle bar 6, which is driven by a drive motor 5 to be vertically reciprocated, and a presser bar 7, which is moved up and down as necessary, are mounted. On the lower end of the needle bar 6 a needle 8 is attached, and on the lower end of the presser bar 7 a presser foot 9 is attached. Below those members a throat plate 11 is placed such that a needle aperture 12 thereof is positioned directly beneath the needle 8.

In this sewing machine a work fabric (hereinafter called workpiece) is held sandwiched manner between a lower frame 21 and an upper frame 22 of a work holder 20 to be moved relative to the needle 8, while the needle 8 is above the upper surface of the bed 1, to be more exact, above the upper surface of the table 4, by virtue of an X pulse motor 23 and a Y pulse motor 24. A pattern forming mechanism is thus formed by those members. The lower frame 21 is connected to a movable member 27 which is movable parallel to X axis (in lateral direction) and is driven by the pulse motor 23 via a rack 25 and a pinion 26. It is slidable also on the movable member 27 due to the action of rollers 28 in the direction of Y axis (forward and backward). The lower frame 21 is connected to another movable member 32 which is movable in parallel to the Y axis and is driven by the pulse motor 24 via a rack 29 and a pinion 31, being similarly slidable on the movable member 32 due to the action of rollers 33 in the X axis direction. The lower frame 21 is, due to the just mentioned structure, movable in parallel to the X axis and the Y axis on the bed 1 according to the rotational direction and angle of the pulse motors 23 and 24, while the upper frame 22 is swingably attached about a rotation shaft (or pin) 34 for being relatively swingable up and down to the lower frame 21 due to the action of a known driving means (not shown) which is connected with the upper frame 22 via a pair of flexible cables 35 and 36. The upper and lower frames 22, 21 are for holding in a forced contact the workpiece therebetween and releasing the same.

Figure 2:
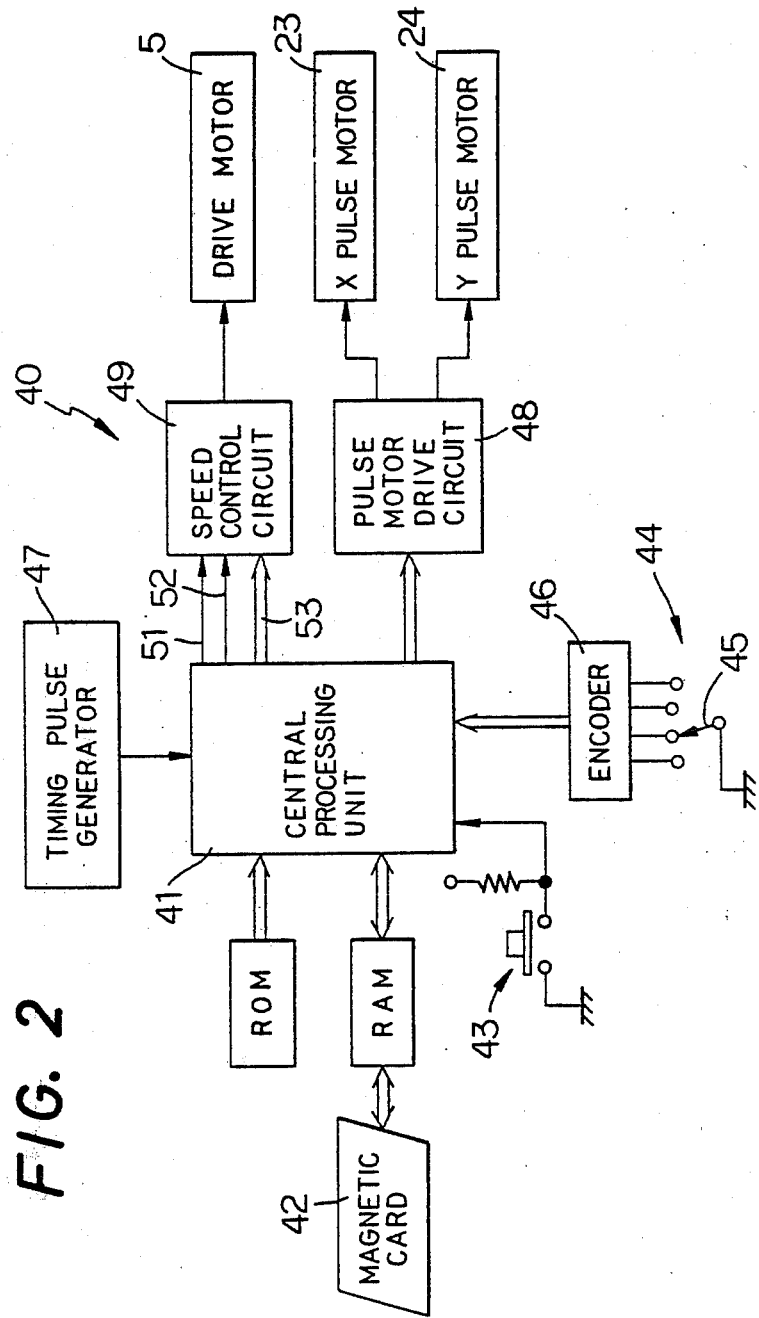
FIG. 2 is a general block diagram showing a control system for the above-mentioned sewing machine.

The machine is control by a controlling system 40 illustrated in FIG. 2 to automatically perform sewing operations. As can be seen in FIG. 2, a central processing unit 41 is provided with a permanent storage means ROM (read-only memory) for storing program instructions or the like and a temporary storage means RAM (random access member) for storing stitch instructions or the like read out from a magnetic card 42 in order to provide the same to the central processing unit 41, storing output data from the central processing unit 41 or providing output data to the magnetic card 41.

To the central processing unit 41 a main switch 43 operable to start and stop the drive motor 5 and a speed divider device 44 are connected, the latter including an encoder 46 provided with four input terminals which may be selectively earthed by means of a selector switch 45. By operating the selector switch 45 speed division data indicating the division ratio variable in four steps can be provided to the central processing unit 41.

To an input terminal of the central processing unit 41 a timing pulse generator 47 is connected to generate a timing signal synchronously with vertical reciprocative movement of the needle 8. Whenever a timing signal is provided to the input terminal, the central processing unit 41 provides a pulse motor drive circuit 48, which is a drive means of a pattern forming mechanism, stitch instruction, which causes the X pulse motor 23 and the Y pulse motor 24 to be driven and simultaneously a speed control circuit 49 to be provided with a speed command 51. This speed command 51 is for controlling the drive motor 5 as to whether it should be rotated at a predetermined low speed (e.g., 200 r.p.m.) or at a permissible higher speed directed by permissible speed data consisting of speed division data 53 from the speed divider device 44 and the maximum permissible speed data 52. By way of examples, the maximum permissible speed data 52 is given as a permissible value of 2000 r.p.m., while the amount of relative movement of the work holder 20 relative to the needle 8 is within a range up to 3 mm, and as a permissible speed of 1000 r.p.m. when the relative movement amount exceeds 3 mm. The speed control circuit 49 determines the rotation speed of the drive motor 5 based on permissible speed data consisting of the maximum permissible speed data and the speed division data 53 from the speed divider device 44. In other words, when the maximum permissible speed is 2000 r.p.m. the rotation speed of the motor 5 is determined, according to the selected contact position of the selector switch 45 which depends upon the contact and state of the sewing operation, for example to any one of the four steps of 2000, 1500, 1000, and 500 r.p.m. It will be determined, when the maximum permissible speed is 1000 r.p.m., for example, to any one of the four steps of 1000, 750, 500, and 250 r.p.m. The drive motor 5 is placed under control to be rotated at the thus determined or decided speed.

Figure 3:
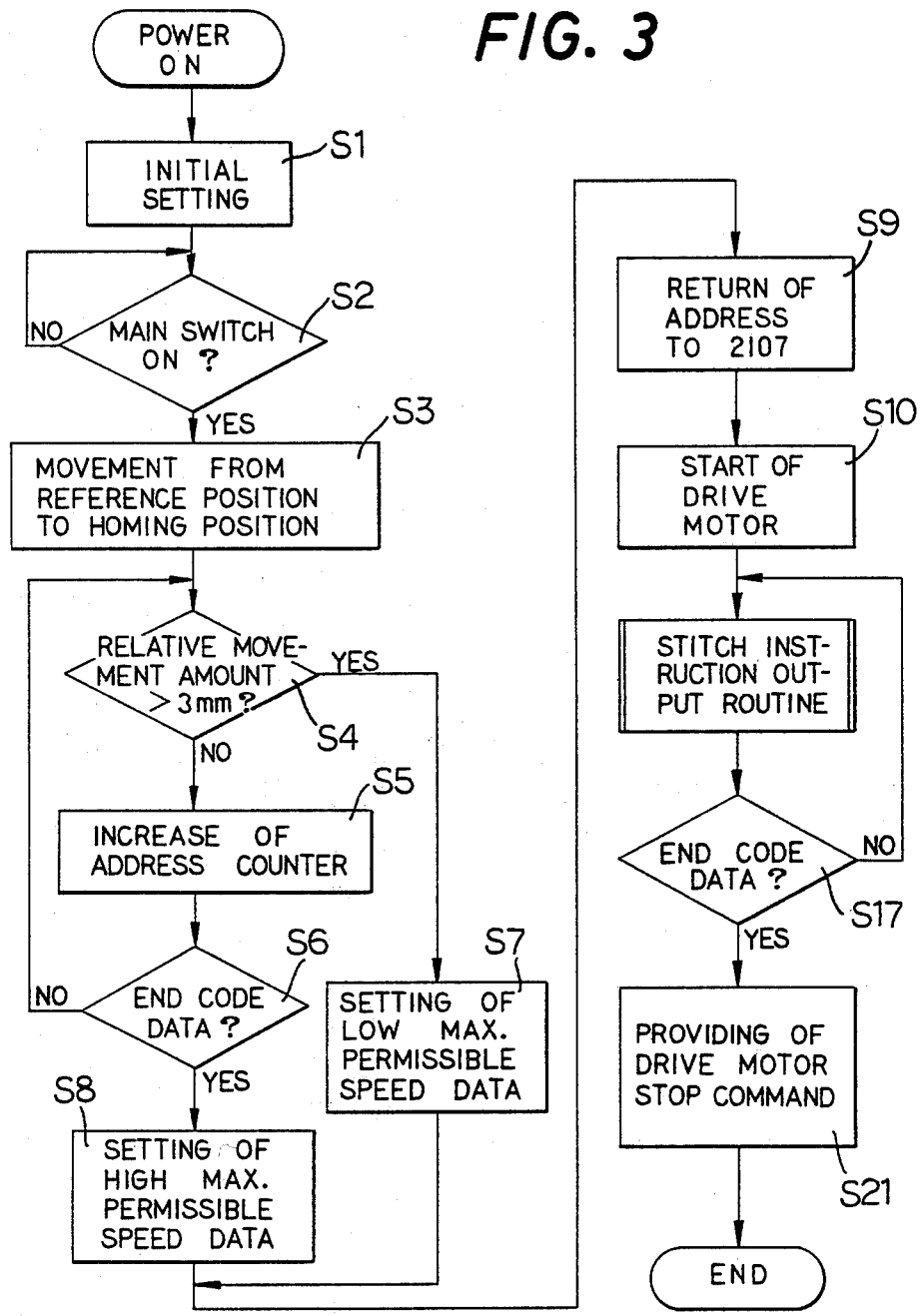
FIG. 3 is a flow chart showing an example of a control program for controlling the operation of the above-mentioned control system.
Figure 4:
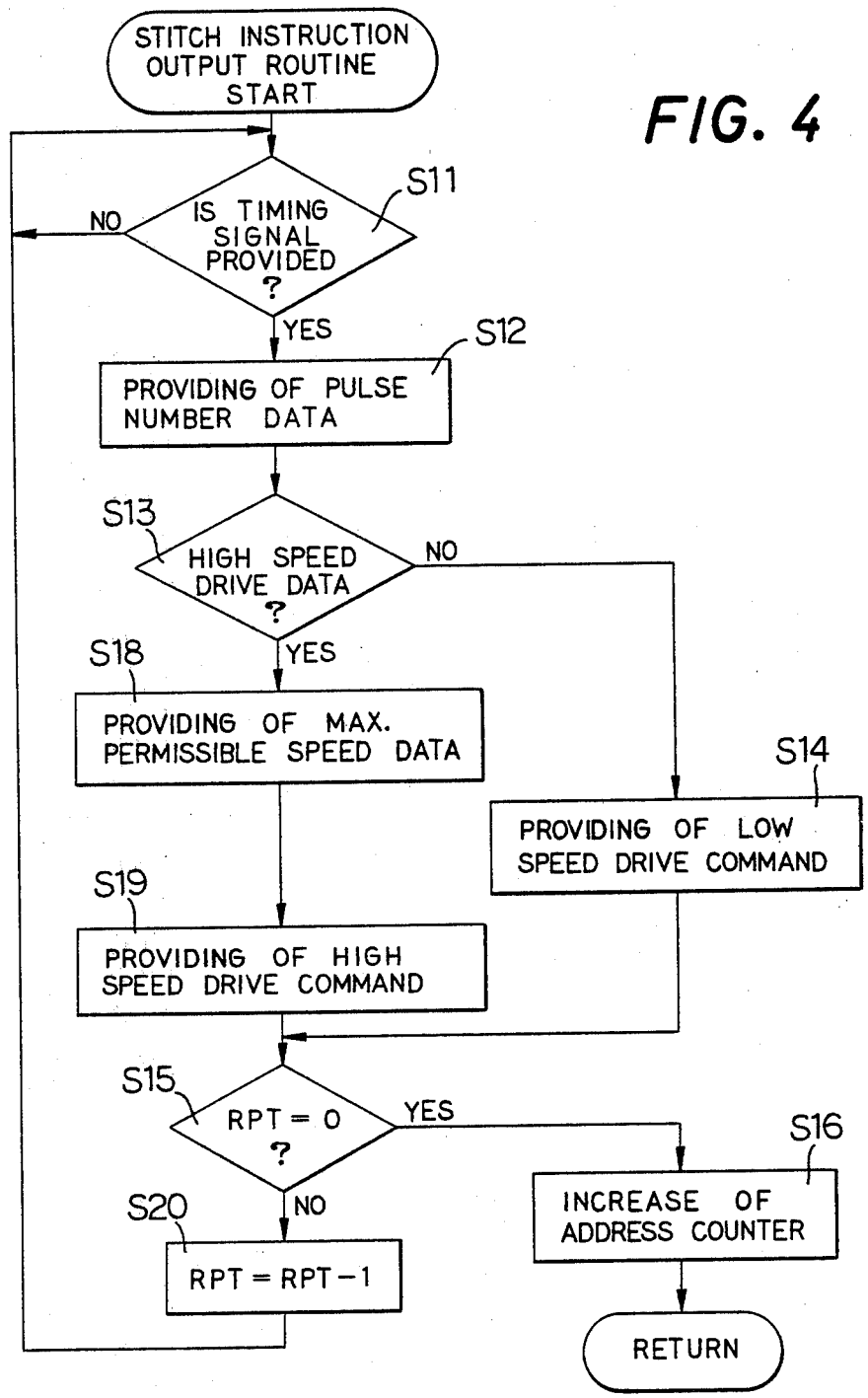
FIG. 4 is a flow chart showing in detail an example of a routine for generating a stitch instruction in the above-mentioned control program.

In the above-mentioned ROM a program represented by the flow charts shown in FIGS. 3 and 4 is stored, and in a magnetic card 42 stitch instructions for carrying out the predetermined sewing operations are stored.

When the magnetic card 42 is set, followed by turning ON of the power, an initial setting process S1 is executed. Each part of the central processing unit 41 is set or reset, and transferring of the stitch instructions from the magnetic card 42 to the RAM is executed.

In the RAM data are consequently stored, as shown for example in Table 1, to the address 2100 and the succeeding ones.

TABLE 1

| Address | Instruction (Data) | | Remarks |
|---|---|---|---|
| 2100 | 01110111 | 77 | Indicating code for instruction-recorded-surface of magnetic card |
| 1 | 00111000 | 38 | Check code for completeness of program |
| 2 | 01010000 | 50 | |
| 3 | 00101100 | 2C | X homing position data |
| 4 | 00000000 | 00 | |
| 5 | 01100001 | 61 | Y homing position data |
| 6 | 00000000 | 00 | |
| 7 | 11110000 | F0 | Stitch instruction for one stitch |
| 8 | 01011000 | 58 | |
| 9 | 01111010 | 7A | Stitch instruction for one stitch |
| A | 01011000 | 58 | |
| B | 11010010 | D2 | Stitch instruction for one stitch |
| C | 11011000 | D8 | |
| D | 11100000 | E0 | Series of stitch instructions for straight seaming |
| E | 11010000 | D0 | |
| F | 11110000 | F0 | |
| 2110 | 11010100 | D4 | |
| 1 | 11100000 | E0 | |
| 2 | 11011000 | D8 | |
| 3 | 11100100 | E4 | Stitch instruction for one stitch |
| 4 | 11011000 | D8 | |
| . | . | . | |
| 2123 | 00011101 | 1D | Series of stitch instructions for straight seaming |
| 4 | 11010000 | D0 | |
| 5 | 00101110 | 2E | |
| 6 | 11010000 | D0 | |
| 7 | 00101110 | 2E | |
| 8 | 01010000 | 50 | |
| 9 | 00101110 | 2E | |
| A | 01011000 | 58 | |
| B | 00000000 | 00 | End code data |
| 212C | 10000000 | 80 | |

The instruction at the address 2100 is an indication code data for indicating whether the stitch instructions are recorded on one surface only or on both surfaces of the card, and the instruction on the addresses 2101 and 2102 is a check code data of a completed program for indicating that the succeeding data are completed.

Each instruction is composed of the data at two addresses of the RAM forming a block. The instruction at the addresses 2103 and 2104 represents an X homing position, that is the number of pulses required to move the work holder 20 in the X axis direction from the reference position or origin to the X homing position. The instruction at the addresses 2105 and 2106 represents a Y homing position. At every two addresses starting from the set of the addresses 2107 and 2108 the stitch instructions are stored, which are respectively composed of pulse number data representing the number of pulses in the X and Y axis directions, drive control data, direction data, and data of the number of repetitions, etc. The pulse number data and the direction data comprise a position data for controlling variation of relative position between the needle 8 and the work holder 20. The upper four bits of the data stored at the address 2107 are the pulse number data in the X axis direction and the lower four bits thereof are the pulse number data in the Y axis direction. On the upper or most significant two bits of the address 2108, which shares one set with the address 2107, a speed data is stored, the content or information of which are shown in TABLE 2.

TABLE 2

| Drive control data | Information |
|---|---|
| 0 1 | Low speed drive |
| 1 1 | High speed drive |
| 0 0 | Stopping |
| 1 0 | End |

The succeeding two bits of the data of the address 2108 are direction data, i.e., data for the movement direction, wherein the upper bit represents Y axis direction and the lower bit X axis direction, and furthermore "0" represents a negative or backward direction and "1" a positive or forward direction. Among the lower four bits of the address 2108 the uppermost one bit is a data for indicating whether the stitch instruction at the addresses 2107 and 2108 is a complete data by itself or not. If the data of the one bit is "1", it represents that the instruction is a completed stitch instruction for one stitch or the last stitch instruction among the stitch instructions for a straight seaming. When the data of the one bit is "0" it represents that the instruction is one of the other stitch instructions than the last stitch instruction among a plurality of stitch instructions for a straight seaming. The remaining three bits are data for the number of repetitions which are shown in FIG. 4 as RPT. A data at the addresses 212B and 212C is an end code data for indicating an end of a series of stitch instructions.

When the main switch 43, after the instruction in the magnetic card 42 have been transferred to the RAM up to the end code data and the initial setting process S1 of FIG. 3 has been finished, is operated for changing a discrimination result in a discrimination step S2 to "YES", a moving step S3 to the stitch-start or homing position is executed. In other words, the pulse motors 23, 24 are driven based on the position data stored at the addresses from 2103 to 2106 of the RAM so as to move the work holder 20 holding the workpiece from the reference position to the stitch-start position.

At the moment of the finish of the movement to the stitch-start position, the instruction at the addresses 2107, 2108 is extracted to be temporarily stored in the working area of the RAM. A movement amount discrimination step S4 for discriminating whether the variation of relative position, i.e., the relative movement amount between the needle 8 and the work holder 20 according to the temporarily stored instruction exceeds 3 mm or not is executed. Incidentally, the above-mentioned working area is one prepared for temporarily storing resultant data from a process in the central processing unit 41 or input data thereto.

As the relative movement amount according to the instruction at the addresses 2107 and 2108 is exactly 3 mm, not extending 3 mm, the discrimination at the movement amount discrimination step S4 becomes "NO", a step S5 for advancing the designated address by the address counter by two is executed. As a result the instruction at the designated address 2109 and the succeeding one 210A is transferred to the working area for being discriminated whether it is an end code data or not. The discrimination result of this step S6 becomes "NO", because the instruction is no end code data. The program is returned at this time to the discrimination step S4.

While the steps S4, S5, and S6 are similarly executed, if there is an instruction directing an excess over 3 mm of the relative movement amount between the needle 8 and the work holder 20 among all the stitch instructions, the discrimination result in the movement amount discrimination step S4 becomes "YES". Based on this discrimination a step S7 for setting a low maximum permissible speed data, i.e., 1000 r.p.m., is executed. In case there is no instruction indicating the excess of 3 mm "YES" will finally come out from the discrimination step S6, which will cause a step S8 for setting a high maximum permissible speed data, i.e., 2000 r.p.m., to be executed.

Upon execution of either step S7 or S8 the designated address by the address counter is returned, in the next step S9, to the address 2107 where a stitch instruction corresponding to the first stitch is stored, and the drive motor 5 is started in the next step S10.

When the main shaft of the machine (not shown) is rotated, being driven by the drive motor 5, up to a certain phase a timing signal is generated from the timing pulse generator 47, which will cause a stitch instruction output routine shown in FIG. 4 to be executed in response to the timing signal. In other words, generation of the timing signal will cause the resultant discrimination in a discrimination step S11 to be "YES", which transfers the stitch instruction at the addresses 2107 and 2108 into the working area. An output step S12 for the number of pulses in the X and Y axis directions is executed according to the instruction in the working area of the RAM. The pulse number data at the address 2107 is delivered from the central processing unit 41 to the pulse motor drive circuit 48.

A discrimination step S13 is then executed for discriminating whether or not the respective drive control data among the stitch instructions transferred to the working area is a high speed drive data. As the drive control data at the address 2108 is "01", being no high speed drive data, the discrimination result of the step S13 is "NO", which will cause an output step S14 for the low speed drive command to be executed. A speed command 51 to the speed control circuit 49 of the central processing unit 41 becomes a low speed drive command and the speed control circuit 49 will rotate the drive motor 5 at 200 r.p.m. independently of the maximum permissible speed set in the step S7 or S8. On the work piece which has been moved by the pulse motors 23, 24 according to the execution of the output step S12 one stitch corresponding to the stitch instruction from the addresses 2107 and 2108 is formed.

On the other hand, in the central processing unit 41 discrimination whether the number of repetitions RPT is "0" or not is executed in a step S15, soon after the execution of the output step S14 of the low speed drive command. As the RPT at the address 2108 is "0" the result of discrimination in the step S15 is "YES", a step S16 for increasing the designated address number of the address counter by two is executed. And consequently returning to the main program shown in FIG. 3 is executed.

After returning to the control program a discrimination step S17 for the end code data is executed. Then a "NO" result of discrimination will come out, because the switch instruction already transferred from the addresses 2109 and 210A to the working area is no end code data. The central processing unit 41 is at this stage in a ready state for executing at any time the stitch instruction output routine upon generation of a timing signal. If therefore a timing signal from the timing pulse generator 47 is applied to the central processing unit 41 the stitch instruction output routine will be executed according to the stitch instruction from the addresses 2109 and 210A. The drive control data is in fact a low speed drive data and the number of repetitions RPT is "0", just like in the previous case. The stitch instruction output routine is executed in an entirely identical manner as in the previous case.

However, the drive control data in the stitch instruction at the addresses 210B and 210C which will be transferred to the working area in response to the next timing pulse is "11", a high speed drive data, so the result of the discrimination step S13 of the stitch instruction output routine becomes "YES", which will cause a step S18 to be executed. The maximum permissible speed data 52 set at the setting step S7 or S8 will be generated. A step 19 is executed soon afterwards for changing the speed command 51 from the central processing unit 41 to high speed drive command. The speed control circuit 49 will determine the rotation speed of the drive motor 5 from the above-mentioned maximum permissible speed data 52 and the speed division data 53 from the above-mentioned speed divider device 44. In other words, when the selector switch 45 is as shown in FIG. 2 at the second contact position, the rotation speed of the drive motor 5 is determined, according to whether the maximum permissible speed data 52 represents 2000 r.p.m. or 1000 r.p.m., at either one of the 1500 r.p.m. or 750 r.p.m., both being the second of the fourstep set speeds. This means that the rotation speed of the drive motor 5 is consequently raised to 750 r.p.m. when a sewing operation including a stitch pitch exceeding 3 mm is carried out and to 1500 r.p.m. when otherwise. As the number of repetitions RPT is "0" the progress of the program hereinafter is identical to that in the previous case.

By repeating the above-mentioned operation stitches are formed one by one, but in a case wherein data representing the number of repetitions RPT in the stitch instruction transferred to the working area is "100" as at the address 2110, for example, the result of discrimination in the step S15 in FIG. 4 becomes "NO". A step S20 for reducing the RPT by one is executed for returning the execution of program to the discrimination step S11. Until the RPT becomes "0" the same operation is repeated, whenever a timing pulse is applied to the central processing unit 41, to form five identical stitchs. At the moment when the RPT becomes "0" the result of discrimination in the step S15 becomes "YES", which will cause the increasing step S16 of the address counter to be executed so as to change the sewing operation to one which is under the influence of a stitch instruction from the addresses 2111 and 2112.

After continuation of the sewing operation in this manner, a transference of the end code data of the addresses 212B and 212C to the working area, will cause the result of discrimination of the step S17 to be changed to "YES" which brings about execution of a step S21 for generating a stop command to the drive motor 5. Halting of the drive motor 5 terminates a series of sewing operations.

In the first embodiment described above, in response to a result of checking whether or not there is a stitch instruction for directing the relative movement amount exceeding 3 mm, either one of the two maximum permissible speeds i.e., 2000 r.p.m. and 1000 r.p.m. will be selected.

Figure 5:
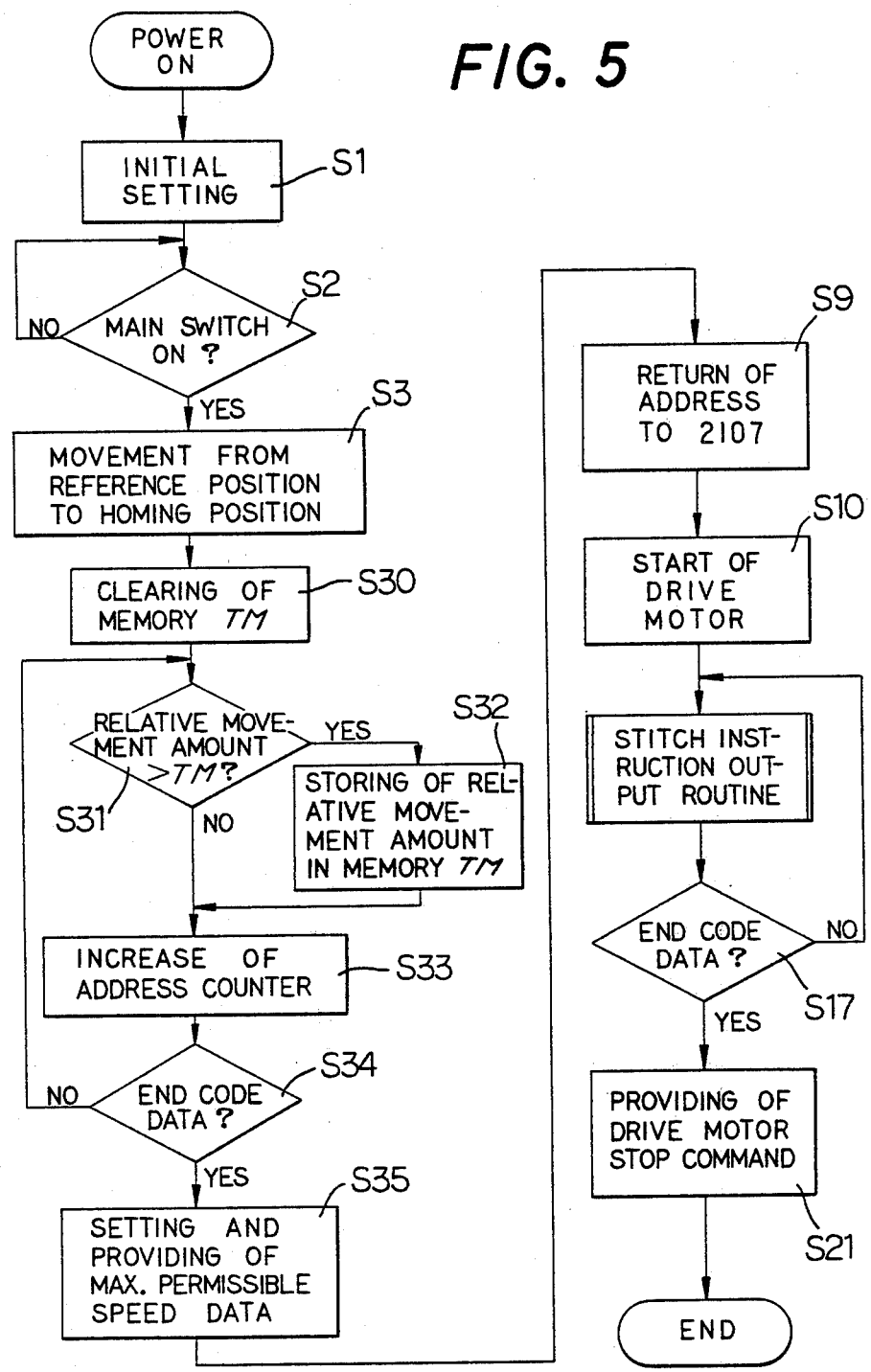
FIG. 5 is a flow chart showing another example of a control program for controlling the operation of the control system shown in FIG. 2.

In the second embodiment, on the contrary, the greatest relative movement is searched among the amounts of relative movement directed by each of the stitch instructions stored in the RAM to determine the maximum permissible speed according to the greatest relative movement amount. Detailed explanation of the operation of the second embodiment will be made hereunder with reference to FIG. 5. The same steps in the control program of the second embodiment in FIG. 5 to those in the control program of the first embodiment in FIG. 3 are allotted the same signs.

Upon switching ON of the power an initial setting step S1 is executed as in the first embodiment. The instructions in the magnetic card 42 is transferred to the addresses beginning at 2100 in the RAM. At the step S2 checking of the operational condition of the main switch 43 is executed and a result of "YES" will cause a step S3 to be executed. By the execution of the step S3 the work holder 20 is moved from the reference position to the homing or stitch starting position.

Subsequently, the content of the temporary memory TM prepared in the RAM will be cleared at a step S30. Then checking whether the relative movement amount directed by the stitch instruction at the addresses 2107, 2108 which have been designated by the address counter is larger than the content of the temporary memory TM or not is executed at a step S31. Because of the relative movement amount being larger than the content of the temporary memory TM, in this case, the relative movement amount is stored in the temporary memory TM at a step S32. Then at a step S33 the address counter is increased to designate the succeeding two addresses in order, and whether the data in the two addresses is end code data or not is checked at a step S34. When a discrimination result for the end code data does not come out from the step S34, the step S31 is again executed, so that the relative movement amount directed by the stitch instruction in the designated addresses by the address counter is compared with the content of the temporary memory TM. When the relative movement amount is larger than the content of the temporary memory TM, the program is advanced to the step S33 via the step S32; when the relative movement amount is smaller than the content of the temporary memory TM the execution is advanced directly to the step S33. Execution from the step S31 to the step S34 is repeated until a discrimination of the end code data comes out. All of the stitch instructions in the RAM are checked by that for storing the greatest relative movement amount in the temporary memory TM. At a step S35 the maximum permissible speed data related to the maximum permissible speed suitable to the greatest relative movement amount in the temporary memory TM is set to be provided as a signal. It is possible to compute and set the maximum permissible speed data based on the largest relative movement amount. It is also possible to set the maximum permissible speed data by means of selecting one corresponding to the content of the temporary memory TM from amoung a plurality of maximum permissible speed data predetermined corresponding to various relative movement amounts and stored in a temporary memory.

After the execution of the step S35, the steps S9 and S10 are executed as in the operation of the first embodiment. A stitch instruction output routine is executed in response to the generation of a timing signal. The stitch forming operation and the stopping operation of the drive motor is identical to those in the first embodiment, superfluous explanation concerned being omitted herewith.

It goes without saying that this invention can be realized in various manners other than the previously described embodiments which are proposed only by way of examples. For example, an alteration of the program in the first embodiment is possible such that the process from the step S4 to the step S7 or S8 for setting the maximum permissible speed from the result of discrimination whether the instruction recorded on a magnetic card 42 includes the relative movement amount between the needle 8 and the work holder 20 which exceeds 3 mm or not can be simultaneously executed with the transferring of the instruction on the magnetic card 42 to the RAM in the initial setting step or process S1, or that the maximum permissible speed may be set at three steps or more. A similar alteration of the program in the second embodiment is also possible. Furthermore, it is also permissible to alter the construction of the machine itself such that the stitch pattern forming mechanism may be composed of a jogging mechanism for controlling the lateral oscillation of the needle 8 and a feeding mechanism for controlling the direction and amount of feed provided by the feed dog.

While the invention has been described in detail above, it is to be understood that this detailed description is by way of example only, and the protection granted is to be limited only within the spirit of the invention and the scope of the following claims.

What is claimed is:

1. In an automatic sewing machine having
    stitch forming instrumentalities including an endwise reciprocatory needle, the combination comprising
    a drive motor for reciprocating the needle to produce stitches in a workpiece,
    drive means operative to vary the relative position between the needle and the workpiece,
    stitch instruction storage means for storing stitch instructions capable of influencing the relative positions to form a stitch pattern,
    means operative synchronously with reciprocation of the needle for extracting the stitch instruction from the stitch instruction storage means in a predetermined sequence, position control means responsive to the extracted stitch instruction for controlling operation of the drive means between successive stitches in the stitch pattern, processing means for scanning all of said stitch instructions in said stitch instruction storage means to determine a maximum permissible speed of said drive motor depending on the variation of said relative position between successive stitches in said stitch pattern and for starting said drive motor to form said stitch pattern after determination of the maximum permissible speed, and speed control means for limiting the actual speed of said drive motor to no more than said maximum permissible speed during formation of said stitch pattern.

2. In an automatic sewing machine having
stitch forming instrumentalities including an endwise reciprocatory needle, the combination comprising
a drive motor for reciprocating the needle to produce stitches in a workpiece,
manual means operable to start the drive motor,
drive means operative to vary the relative position between the needle and the workpiece,
stitch instruction storage means containing a plurality of randomly addressable storage locations for storing stitch instructions representing the relative positions to form a stitch pattern,
means for addressing said storage locations in timed relation to reciprocation of the needle,
position control means responsive to the stitch instruction in the addressed storage location for controlling operation of the drive means between successive stitches in the stitch pattern,
processing means responsive to the operation of said manual means for sequentially addressing all of said storage locations regardless of reciprocation of said needle to examine the variation of said relative position between successive stitches in said stitch pattern, for selecting one speed from among predetermined maximum permissible speeds depending on the result of the examination, and for starting said drive motor to form said stitch pattern after selection of the maximum permissible speed, and
speed control means for limiting the actual speed of said drive motor to no more than said selected maximum permissible speed during formation of said stitch pattern.

3. The improvement according to claim 2, including
manual means operative to select one from among a plurality of predetermined ratios for dividing the maximum permissible speed selected by said processing means,
whereby said permissible speed data is generated by said processing means on the basis of the selected ratio and the selected maximum permissible speed.

4. The improvement according to claim 2, wherein said processing means stops generation of said permissible speed data and provides to said speed control means low speed data related to a constant speed substantially lower than said predetermined maximum permissible speeds while the predetermined number of stitches are being produced at the beginning and the end of said stitch pattern.

5. The improvement according to claim 4, wherein each of said stitch instructions includes position data representing said relative position and drive control data associated with the position data, and said processing means selectively generates one of said low speed data and said permissible speed data in accordance with the drive control data.

6. The improvement according to claim 2, wherein said processing means scans all of said stitch instructions stored in said stitch instruction storage means to compare each of said variations of said relative positions with a predetermined value and generates first permissible speed data representing a high maximum permissible speed when all of said variations are the predetermined value or less and second permissible speed data representing a low maximum permissible speed when at least one of said variations is above the predetermined value.

7. The improvement according to claim 6, wherein said stitch instruction storage means stores end code data representing the end of said stitch pattern, and said processing means includes stitch instruction scanning means for sequentially extracting each of said stitch instructions and said end code data stored in said stitch instruction storage means regardless of reciprocation of said needle and generates said first permissible speed data when said stitch instruction scanning means extracts said end code data.

8. The improvement according to claim 6, wherein said processing means includes stitch instruction scanning means for sequentially extracting each of said stitch instructions stored in said stitch instruction storage means regardless of reciprocation of said needle and generates said second permissible speed data when said stitch instruction scanning means extracts stitch instruction representing said variation more than said predetermined value.

9. A method of sewing a workpiece with an automatic sewing machine, the automatic sewing machine having stitch forming instrumentalities including an endwise reciprocatory needle, a drive motor for reciprocating the needle to produce stitches in a workpiece, drive means operative to vary the relative position between the needle and the workpiece, stitch instruction storage means for storing stitch instructions capable of influencing the relative positions to form a stitch pattern, means operative synchronously with reciprocation of the needle for extracting the stitch instruction from the stitch instruction storage means in a predetermined sequence, and position control means responsive to the extracted stitch instruction for controlling operation of the drive means between successive stitches in the stitch pattern, the method comprising the steps in seriatim of:
scanning all of said stitch instructions stored in said stitch instruction storage means to examine variation of said relative position between successive stitches in a stitch pattern;
determining a maximum permissible speed depending on the result of said examination;
starting said drive motor to form said stitch pattern,
generating permissible speed data related to said maximum permissible speed synchronously with reciprocation of said needle; and
limiting the actual speed of said drive motor to no more than said maximum permissible speed data during formation of said stitch pattern.

* * * * *